(12) United States Patent
Stallcup, II et al.

(10) Patent No.: US 6,812,460 B1
(45) Date of Patent: Nov. 2, 2004

(54) NANO-MANIPULATION BY GYRATION

(75) Inventors: Richard E. Stallcup, II, Little Elm, TX (US); Christof Baur, Dallas, TX (US)

(73) Assignee: Zyvex Corporation, Richardson, TX (US)

( * ) Notice: Subject to any disclaimer, the term of this patent is extended or adjusted under 35 U.S.C. 154(b) by 0 days.

(21) Appl. No.: 10/680,339

(22) Filed: Oct. 7, 2003

(51) Int. Cl.[7] .................................. H01J 37/26
(52) U.S. Cl. ........................... 250/307; 250/306
(58) Field of Search ..................... 250/307, 306, 250/492.3, 492.2, 310; 73/105, 1.89

(56) References Cited

U.S. PATENT DOCUMENTS

| | | | | |
|---|---|---|---|---|
| 5,365,073 A | * | 11/1994 | White | 250/492.3 |
| 5,763,933 A | * | 6/1998 | White | 257/528 |
| 5,992,226 A | * | 11/1999 | Green et al. | 73/105 |
| 6,479,892 B1 | * | 11/2002 | Hopson et al. | 257/684 |
| 6,608,307 B1 | * | 8/2003 | Baur | 250/306 |
| 6,611,178 B1 | * | 8/2003 | Kawakatsu et al. | 331/154 |

OTHER PUBLICATIONS

Richard Terra, "Manipulating Atoms and Molecules With the Scanning Tunneling Microscope and Atomic Force Microscope", Mar. 7, 2002, www.nanozine.com/nano-tool.htm.

* cited by examiner

Primary Examiner—John R. Lee
Assistant Examiner—Johnnie L Smith, II
(74) Attorney, Agent, or Firm—Haynes and Boone, LLP

(57) ABSTRACT

A method of nano-manipulation, including providing a nano-scale object movably positioned over a substrate and positioning a probe of a scanning probe microscope proximate the nano-scale object. The probe is then moved across the substrate along a gyrating path proximate the nano-scale object to reposition the nano-scale object.

20 Claims, 3 Drawing Sheets

NANO-MANIPULATION BY GYRATION

BACKGROUND

The present disclosure relates generally to nano-scale surface scanning technology and, more specifically, to the manipulation of nano-scale objects by gyration.

Typical prior art scanning probe microscopes employ a probe tip sharpened to an apex of atomic scale dimensions. In general, operation of a scanning probe microscope includes bringing the probe tip into close proximity with a surface being sampled, such that a sensing device coupled to the probe tip detects local interaction between the probe tip and the sample surface. A feedback loop is often employed to maintain constant interaction strength between the probe tip and the sample surface as the probe tip scans across the sample surface. The displacement of the probe tip as it scans across the undulations of the sample surface is then detected and converted into a contour map of the surface.

This concept is generally employed by a variety of conventional scanning probe devices to investigate surface features of micro-scale and nano-scale samples. For example, scanning tunneling microscopes may be employed to detect localized interactions attributable to electronic tunneling. Atomic force microscopes may also be employed to detect localized interactions attributable to Van der Waals and atomic repulsive forces. Such arrangements can be employed to detect surfaces variations with atomic scale resolution. Other devices that operate according to this general concept include near-field scanning optical microscopes, scanning tunneling optical microscopes, near-field scanning acoustical microscopes, scanning capacitance microscopes and scanning electrochemistry microscope.

These devices may also be employed in the manipulation of nano-scale objects, such as by methods taking advantage of the repulsive forces (e.g., Pauli repulsion) between molecules. Such conventional methods, often referred to as pushing, manipulation or nano-manipulation, have been applied to many different nano-scale objects, including atoms, molecules, colloids and clusters. For example, a conventional pushing method includes selecting a molecule to be repositioned across a substrate, selecting a target location on the substrate, configuring a scanning probe device for a straight line scan from the molecule location to the target location and performing the single straight line scan, thereby "pushing" the molecule along a straight line to the target location.

However, successfully performing such nano-manipulation requires repulsive forces between the probe tip and the molecule being repositioned to be large enough to overcome attractive forces between the nano-scale object and the underlying substrate that can bind the nano-scale object to its current location. Accordingly, many nano-manipulation methods adjust the set-point of the feedback loop or other operating parameters during the manipulation, such as to decrease the separation between the probe tip and the surface on which the nano-scale object being repositioned is located. However, such methods have proven to be unreliable and imprecise. For example, atomic and molecular processes such as diffusion and thermally-activated hopping can lead to an intrinsic motion of the nano-scale object that compromises the intended nano-manipulation.

Accordingly, what is needed in the art is a nano-manipulation method that addresses the problems discussed above.

SUMMARY

The present disclosure provides a method of nano-manipulation that, in one embodiment, includes providing a nano-scale object movably located over a substrate and positioning a probe of a scanning probe microscope proximate the nano-scale object. The probe is then moved across the substrate along a gyrating path proximate the nano-scale object to reposition the nano-scale object.

In another embodiment, a method of nano-manipulation according to aspects of the present disclosure includes providing a plurality of nano-scale objects movably located over a substrate and positioning a probe of a scanning probe microscope proximate the plurality of nano-scale objects. The probe is then moved across the substrate along a gyrating path proximate the plurality of nano-scale objects to reposition at least one of the plurality of nano-scale objects.

The present disclosure also introduces a system for nano-manipulation. In one embodiment, the system includes means for supporting a substrate having a nano-scale object movably located thereon, means for positioning a probe of a scanning probe microscope proximate the nano-scale object, and means for moving the probe relative to the substrate along a gyrating path proximate the nano-scale object to reposition the nano-scale object.

The foregoing has outlined preferred and alternative features of several embodiments so that those skilled in the art may better understand the detailed description that follows. Additional features will be described below that further form the subject of the claims herein. Those skilled in the art should appreciate that they can readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. Reference is now made to the following descriptions taken in conjunction with the accompanying drawings.

DETAILED DESCRIPTION

Figure 1:
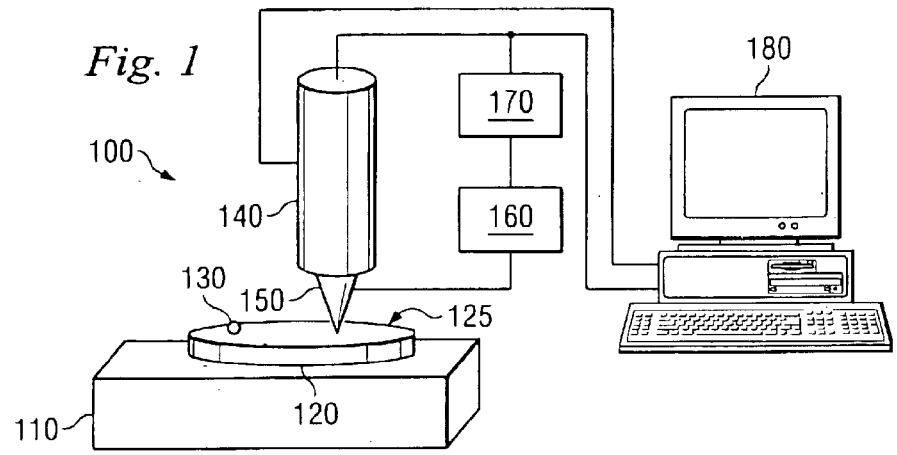
FIG. 1 illustrates a schematic view of one embodiment of a nano-manipulation system constructed according to aspects of the present disclosure.

It is to be understood that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Furthermore, as used herein, nano-scale objects contemplate atoms, molecules, macromolecules, dendrimers, colloids, clusters and other microscopic objects. In one embodiment, nano-scale objects manipulated according to aspects of the present disclosure may have dimensions ranging between about 5 Angstroms and about 500 Angstroms.

Referring to FIG. 1, illustrated is a schematic view of one embodiment of a system 100 for manipulating a nano-scale object 130, or nano-manipulation, according to aspects of the present disclosure. The system 100 may include a positionable table 110 or other means for supporting a substrate 120 having the nano-scale object 130 movably located thereon. The positionable table 110 may have up to 6 degrees-of-freedom. The system 100 also includes a scanning probe microscope (SPM) 140 having a probe 150 and configured to position the probe 150 proximate the nano-scale object 130. Although not limited as such, the SPM 140 may be or comprise a scanning tunneling microscope, an atomic force microscope, a near-field scanning optical microscope, a scanning tunneling optical microscope, a near-field scanning acoustical microscope, a scanning capacitance microscope or a scanning electrochemistry microscope. In the illustrated embodiment, the SPM 140 may be or comprise a piezo-tube or other type of fine positioner, such as those conventionally employed in an SPM in coordination with a positionable table and sensing and feedback devices. As will be further described below, the table 110 and/or the SPM 140 is configured to move the probe 150 relative to the substrate 120 along a gyrating path proximate the nano-scale object 130, thereby repositioning the nano-scale object 130. Also, although not illustrated as such, the probe 150 may be interchangeable within the SPM 140, such as in applications in which separate probes 150 are employed for surface study and nano-manipulation.

A sensing device 160 and a feedback device 170 electrically coupled between the SPM 140 and the probe 150 may be integral to or discrete from the system 100. The sensing device 160 may be configured to control or assist in the detection of forces and interactions between the probe 150, the nano-scale object 130 and a surface 125 of the substrate 120. The feedback device 170 may be configured to control or assist in the control of the separation between the probe 150, the nano-scale object 130 and the substrate surface 125, such as by analysis of the forces or interactions detected by the sensing device 160. The sensing device 160 and the feedback device 170 are schematically depicted in FIG. 1 because they may comprise conventional or future-developed devices, are known in the art and are not limited by the scope of the present disclosure. A computing device 180 integral to or discrete from the system 100 may also be employed to assist in the control of movement of the probe 150, such as by storing and analyzing data collected by the sensing device 160 and providing electronic signals to the SPM 140 and/or the feedback device 170.

Figure 2:
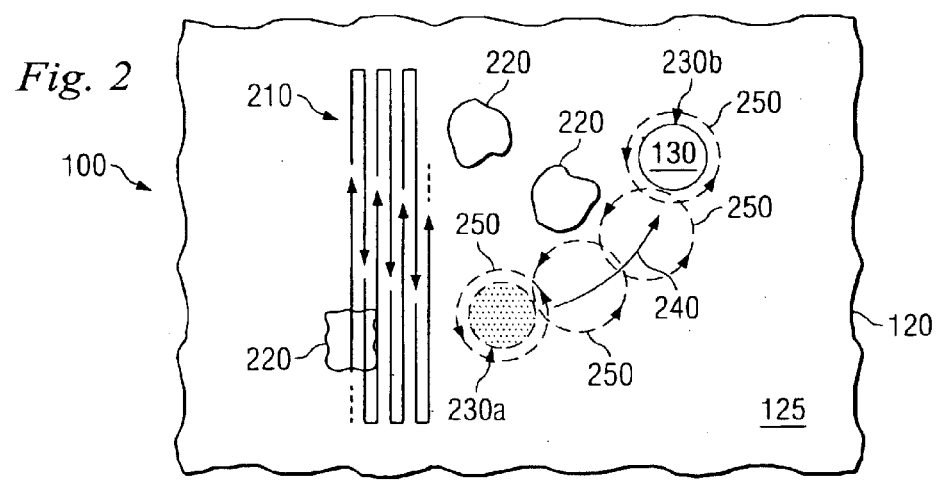
FIG. 2 illustrates a plan view of one embodiment of a nano-scale object being nano-manipulated according to aspects of the present disclosure.

Referring to FIG. 2, illustrated is a plan view of one embodiment of a method of nano-manipulation according to aspects of the present disclosure. The method may be performed by a nano-manipulation system, such as the system 100 shown in FIG. 1. Accordingly, although nano-manipulation methods may be performed according to aspects of the present disclosure by systems other than the nano-manipulation system 100 shown in FIG. 1, for the purpose of simplicity, embodiments of nano-manipulation methods according to aspects of the present disclosure will be described herein with reference to the system 100 shown in FIG. 1, such that reference numbers of illustrated elements may be carried through to subsequent figures.

Prior to repositioning or other manipulation of a nano-scale object according to aspects of the present disclosure, the SPM 140 may be employed to scan the surface 125 of the substrate 120, such as to provide a contour map or other image of the surface 125, possibly including the nano-scale object 130 movably located on or over the substrate 120. For example, as illustrated in FIG. 2, a sweep may be performed by the probe across the substrate surface 125 in a rectilinear fashion, as indicated by the path 210, or by employing another path shape. Such a contour map or other image may be useful during subsequently performed nano-manipulation. For example, one or more undulations 220 in the substrate surface 125 may be revealed by a preliminary scan of the surface 125. Such undulations 220 may be convex or concave with respect to the substrate surface 125, and may impede the movement of a nano-scale object 130. After scanning the surface 125, the probe 150 may be replaced with a different type of probe 150 for nano-manipulation, although in a preferred embodiment a single probe is employed for surface study and nano-manipulation.

A typical objective of nano-manipulation is the repositioning of a nano-scale object. For example, in the embodiment illustrated in FIG. 2, the objective is to reposition the nano-scale object 130 from a first position 230a to a second position 230b while avoiding undulations 220. Accordingly, a repositioning path or pattern 240 traversed by the nano-scale object 130 during repositioning may be arcuate or otherwise curved. The repositioning pattern 240 may also be rectilinear, comprising a plurality of concatenated, substantially straight segments. The repositioning pattern 240 may also comprise a single, straight segment possibly overlying one or more of the undulations 220, although such embodiments may be less desirable in some applications.

The nano-scale object 130 may be repositioned between the first and second positions 230a, 230b by gyrating the probe 150 of the SPM 140 shown in FIG. 1 while also repositioning the probe 150 toward the second position 230b. For example, the gyration of the probe 150 may comprise moving the probe 150 along orbital patterns 250 around the nano-scale object 130 as the nano-scale object 130 is moved along the repositioning pattern 240. The speed at which the probe 150 may traverse the orbital patterns 250 (e.g., a gyrating speed) may be faster than the speed at which the probe 150 may traverse the repositioning pattern 240 (e.g., a repositioning speed).

Figure 3:
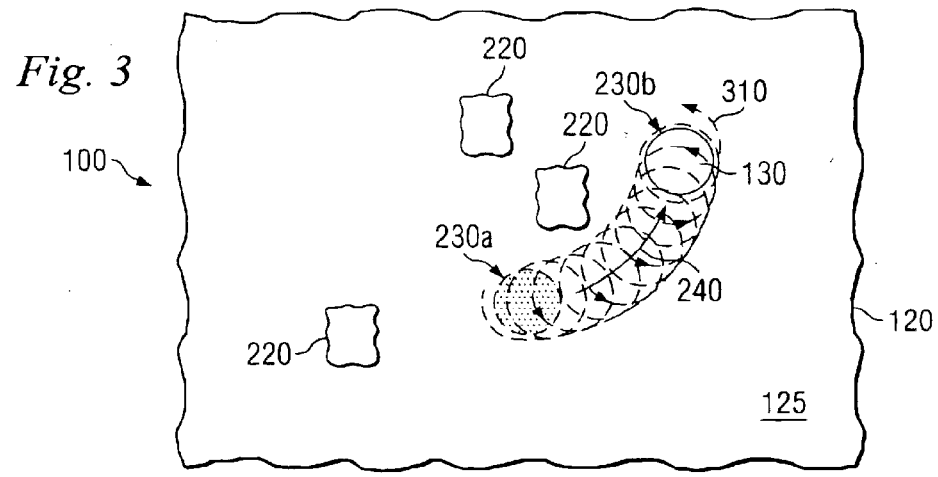
FIG. 3 illustrates a plan view of another embodiment of the nano-manipulation shown in FIG. 2.

FIG. 3 illustrates a plan view of a portion of the system 100 shown in FIG. 1 demonstrating the superposition of the orbital patterns 250 and the repositioning pattern 240 shown in FIG. 2 to form a gyrating path 310 which may be employed in the nano-manipulation of the nano-scale object 130 according to aspects of the present disclosure. Referring to FIGS. 1 and 3 collectively, as the probe 150 travels along the gyrating path 310, the probe 150 may exert repulsive forces radially inward on the nano-scale object 130. The repulsive forces will be greater as the nano-scale object 130 and the probe 150 become closer together as the probe moves along the gyrating path 310. Consequently, the probe 150 may confine the nano-scale object 130 within a dynamic volume traced by the probe 150 as it traverses the gyrating path 310. Accordingly, when the nano-scale object 130 nears the perimeter of the dynamic volume, or the boundary of the gyrating path 310, the probe 150 repels the nano-scale object 130 toward the inside of the dynamic volume, such that the nano-scale object 130 may effectively be captured or trapped by the gyrating probe 150.

It should be noted that the size of the nano-scale object 130 and the dimensions of the gyrating path 310 are exaggerated in the figures for the purpose of illustration. Also, nano-manipulation parameters including the gyrating speed, the size and shape of the gyrating path 310 and patterns 250, the repositioning speed, the shape of the repositioning path 240 and the operational parameters of the SPM 140 (e.g., the feedback set-point) may be adjusted and optimized with respect to the particular SPM 140 employed for the nano-manipulation. The nano-manipulation parameters may also be adjusted and optimized according to the type, size and shape of the nano-scale object 130, the substrate 120 and the desired positional accuracy.

In some embodiments, including the embodiment illustrated in FIG. 3, the gyrating speed may be faster than the repositioning speed, such that the nano-scale object 130 remains within the confines of the gyrating path 310. Moreover, the gyrating speed is not necessarily limited by the response time of the feedback loop of the SPM 140 because the gyrating path 310 may be substantially parallel to the surface 125 of the substrate 120, and may therefore act in a direction that is substantially orthogonal to the direction affected by the feedback loop.

The gyrating speed may also be relatively slow, if desired, such as in applications in which the specifications of the particular SPM 140 employed for the nano-manipulation limits the translation speed of the probe 150. In some embodiments, such as those in which the gyrating speed may be relatively slow, the probe 150 may also follow the topography of the substrate surface 125 while traversing the gyrating path 310. Such an embodiment may be advantageous when the substrate surface 125 is more irregular. The table 110 or other means for supporting the substrate 120 under the probe 150 may also be employed to reposition the substrate 120 relative to the probe 150. In one embodiment, the table 110 and the SPM 140 may cooperate to move the probe 150 along the gyrating path 310 across the substrate surface 125.

The gyrating path 310 may be adjusted or modified to account for positional errors of the SPM 140, the size and shape of the nano-scale object 130, the type and topography of the substrate surface 125 over which the nano-scale object 130 is manipulated and the desired accuracy of the nano-manipulation. Relatively large nano-scale objects and large positional errors of the SPM 140 may be compensated for by a somewhat larger size and/or shape of the gyrating pattern(s) 250. The size and/or shape of the gyrating pattern(s) 250 may also be chosen to be as small as possible to increase positional accuracy.

Figure 4:
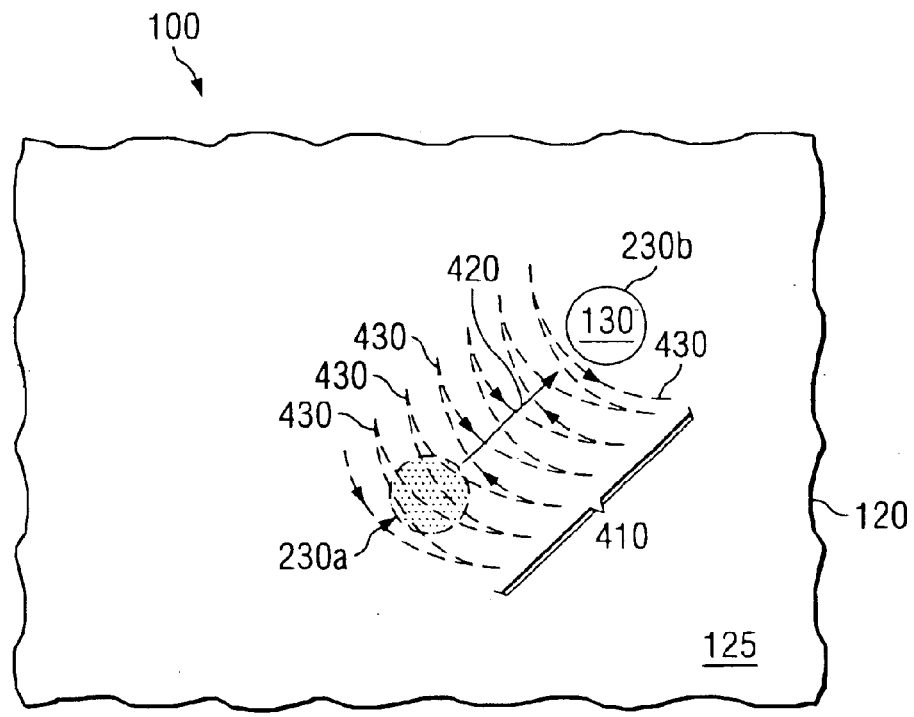
FIG. 4 illustrates a plan view of another embodiment of nano-manipulation according to aspects of the present disclosure.

FIG. 4 illustrates a plan view of a portion of the system 100 shown in FIG. 1 and depicts another embodiment of nano-manipulation according to aspects of the present disclosure. Referring to FIGS. 1 and 4 collectively, the nano-scale object 130 may also be repositioned between first and second positions 230a, 230b by moving the probe 150 along a gyrating path 410 that includes a substantially straight repositioning path 420 and a gyrating pattern comprising a series of arcuate segments 430 that do not substantially enclose an area around the nano-scale object 130. The arcuate segments 430 may be non-tangential, as illustrated in FIG. 4, and as such may be only partially orbital and not completely closed. Thus, the gyrating path 410 may not entirely enclose the nano-scale object 130 during nano-manipulation. In such an embodiment, the repositioning speed may be increased because the probe 150 is not required to travel completely around the nano-scale object 130 with each gyration.

Figure 5:
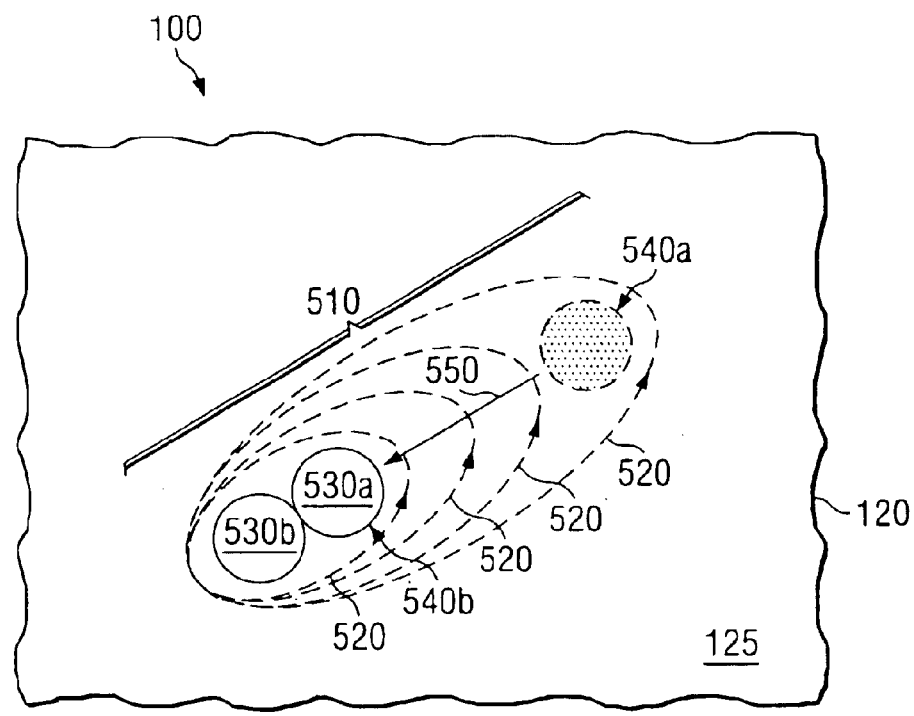
FIG. 5 illustrates a plan view of another embodiment of nano-manipulation according to aspects of the present disclosure.

FIG. 5 illustrates a plan view of a portion of the system 100 shown in FIG. 1 and depicts another embodiment of nano-manipulation according to aspects of the present disclosure. Referring to FIGS. 1 and 5 collectively, the nano-scale object 130 may also be repositioned along a gyrating path 510 that includes elliptical or otherwise non-circular gyrating patterns 520. Moreover, nano-manipulation according to aspects of the present disclosure may be employed to bring two nano-scale objects 530a, 530b into contact or close proximity. In such applications, the gyrating path 510 may encompass multiple nano-scale objects 530a, 530b. For example, as shown in FIG. 5, a gyrating path 510 may constrict with time such that a first nano-scale object 530a may be repositioned from a first position 540a to a second position 540b adjacent a second nano-scale object 530b along a repositioning pattern 550.

Figure 6:
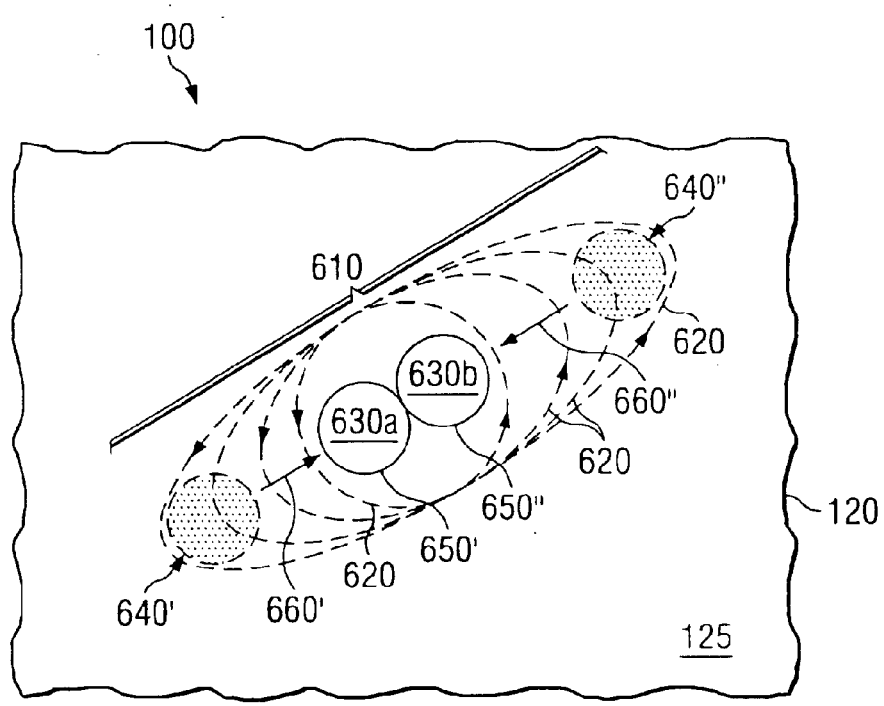
FIG. 6 illustrates a plan view of another embodiment of nano-manipulation according to aspects of the present disclosure.

Referring to FIG. 6, illustrated is a plan view of a portion of the system 100 shown in FIG. 1 and depicting another embodiment of nano-manipulation according to aspects of the present disclosure. A gyrating path 610 having circular or non-circular patterns 620 may be employed to reposition first and second nano-scale objects 630a, 630b from first positions 640', 640" to second positions 650', 650", respectively, along repositioning patterns 660', 660". Such an embodiment may be advantageous in applications in which it is desired to group or cluster two or more nano-scale objects 630 within a common area.

Figure 7:
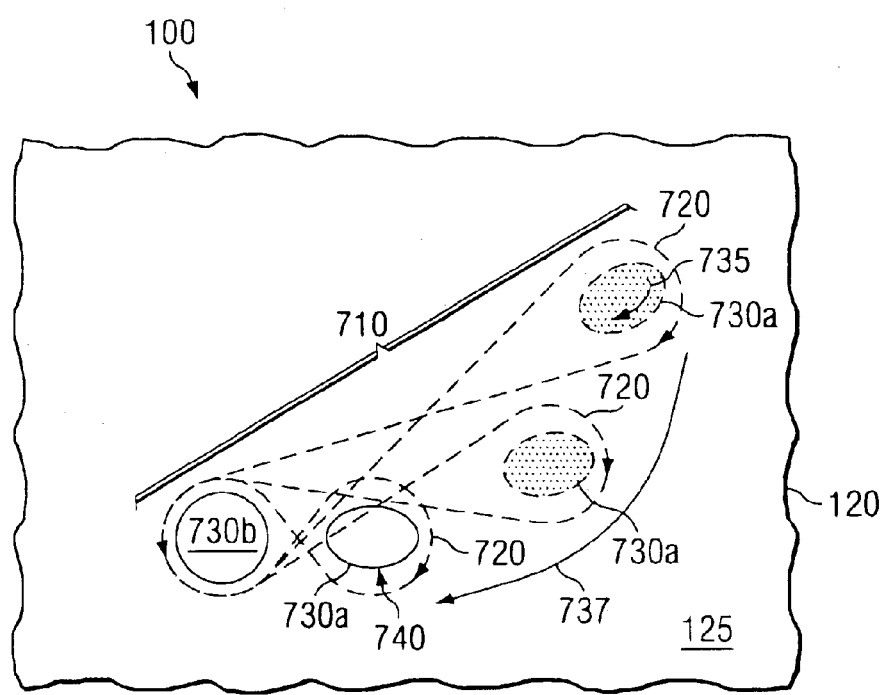
FIG. 7 illustrates a plan view of another embodiment of nano-manipulation according to aspects of the present disclosure.

Nano-manipulation according to aspects of the present disclosure may also be employed to rotate nano-scale objects or their orientation relative to other nano-scale objects. Referring to FIG. 7, illustrated is a plan view of a portion of the system 100 shown in FIG. 1 and depicting such an embodiment of nano-manipulation. As shown in FIG. 7, a gyrating path 710 may include successively rotated gyrating patterns 720. Accordingly, the nano-scale object 730a may be rotated with respect to its centerline axis, as indicated by the arrow 735. Moreover, the repositioning of the nano-scale object 730a to a location 740 adjacent a second nano-scale object 730b may include rotating the nano-scale object 730a with respect to a central axis of the second nano-scale object 730b, as indicated by the arrow 737, as the first nano-scale object 730a is moved closer to the second nano-scale object 730b.

As also shown in FIG. 7, the gyrating patterns 720 may each include two or more enclosed areas, such that the patterns 720 may each resemble a figure eight. Each lobe or enclosed area of the gyrating patterns 720 may enclose one or more nano-scale objects (730a, 730b) requiring repositioning. Such an embodiment is illustrated to demonstrate that the shape of the gyrating patterns and paths are not limited by the scope of the present disclosure. That is, nano-manipulation performed according to aspects of the present disclosure may employ any gyrating pattern or shape configured to gyrate the probe of an SPM proximate one or more nano-scale objects such that repulsive forces between the probe and the nano-scale object(s) may laterally and/or rotationally reposition the nano-scale object(s) as desired.

Topography information acquired by an SPM during nano-manipulation of a nano-scale object according to aspects of the present disclosure may be used to confirm position and other information. If the nano-manipulation is performed relatively slowly, such that the feedback of the SPM is fast enough to adjust the tip-to-sample distance, topography data acquired and processed during nano-manipulation may be compared with the topography of a previously acquired image and yield information about the position of the nano-scale object and/or the probe. In applications in which the probe is gyrated so quickly that the topography signal of the SPM does not contain any information which could be attributed to the gyration of the probe, the signal generated by the sensing device may still contain topography information that may be correlated to the translation of the probe, and this information may be used to similarly ascertain information about the position of the nano-scale object and/or the probe.

Accordingly, in one embodiment, feedback regarding the progress of nano-manipulation and surface topology may be obtained during nano-manipulation, such as by employing the sensing device 160 of FIG. 1. For example, an increase of the repulsive forces between the probe 150 and the nano-scale object 130 may be associated with a change in the signal generated by the sensing device 160. Similarly, intermittent or regular repulsive forces indicated by the sensing device 160 may indicate the loss of confinement of the nano-scale object 130 within the dynamic volume defined by the gyrating probe 150.

Nano-manipulation according to aspects of the present disclosure may be implemented with existing equipment and technology. For example, SPM probes conventionally employed to investigate micro- and nano-scale surface samples may also be employed to reposition nano-scale objects according to aspects of the present disclosure. Similarly, conventional equipment employed to raster an SPM probe across a surface for a surface study may also be employed to move the probe along a gyrating path according to aspects of the present disclosure. Such conventional SPM equipment and SPM probe positioning equipment often employs positioners controlled by low-voltage signals, wherein separate signals may drive X- and Y-axis positioners to move the probe across a surface. For example, an exemplary gyrating path may extend in first and second orthogonal directions and X- and Y-positioners may be controlled to move the probe in the first and second directions according to first and second sine waves, respectively. The first and second sine waves may have substantially equal frequencies and may be orthogonally out of phase. These control parameters may be controlled according to aspects of the present disclosure by SPM controller software, by discrete circuits generating supplemental signals or by a combination of these methods.

Although embodiments of the present disclosure have been described in detail, those skilled in the art should understand that they can make various changes, substitutions and alteration herein without departing from the spirit and scope of the present disclosure.

What is claimed is:

1. A method of nano-manipulation, comprising:

providing a nano-scale object movably located over a substrate;

positioning a probe of a scanning probe microscope proximate the nano-scale object; and moving the probe across the substrate along a gyrating path proximate the nano-scale object to reposition the nano-scale object.

2. The method of claim 1 wherein moving the probe along the gyrating path confines the nano-scale object within a dynamic volume.

3. The method of claim 1 wherein the gyrating path comprises a gyrating pattern superimposed with a desired repositioning pattern.

4. The method of claim 3 wherein the gyrating pattern defines an enclosed area around the nano-scale object.

5. The method of claim 3 wherein the gyrating pattern comprises an orbiting pattern.

6. The method of claim 5 wherein the orbiting pattern is substantially circular.

7. The method of claim 3 wherein the repositioning pattern comprises a substantially straight line.

8. The method of claim 3 wherein the repositioning pattern comprises an arcuate pattern.

9. The method of claim 1 wherein moving the probe along the gyrating path repositions the nano-scale object continuously.

10. The method of claim 1 further comprising collecting data with the scanning probe microscope to monitor and control the gyrating path.

11. The method of claim 1 wherein the nano-scale object is an atom.

12. The method of claim 1 wherein the nano-scale object is a molecule.

13. The method of claim 1 wherein the scanning probe microscope is selected from the group consisting of:

a scanning tunneling microscope;

an atomic force microscope;

a near-field scanning optical microscope;

a scanning tunneling optical microscope;

a near-field scanning acoustical microscope;

a scanning capacitance microscope; and a scanning electrochemistry microscope.

14. A method of nano-manipulation, comprising:

providing a plurality of nano-scale objects movably located over a substrate;

positioning a probe of a scanning probe microscope proximate the plurality of nano-scale objects; and moving the probe across the substrate along a gyrating path proximate the plurality of nano-scale objects to reposition at least one of the plurality of nano-scale objects.

15. The method of claim 14 wherein moving the probe along the gyrating path confines the at least one of the plurality of nano-scale objects within a dynamic volume.

16. The method of claim 14 wherein the gyrating path comprises a gyrating pattern that defines an enclosed area around at least one of the plurality of nano-scale objects.

17. The method of claim 14 wherein the gyrating path contracts with time to position at least two of the plurality of nano-scale objects in close proximity.

18. The method of claim 14 wherein the gyrating path comprises a gyrating pattern that defines a plurality of enclosed areas each surrounding at least one of the plurality of nano-scale objects.

19. The method of claim 1 wherein the gyrating path extends in first and second orthogonal directions and the probe moves in the first and second directions according to first and second sine waves, respectively, wherein the first and second sine waves have substantially equal frequencies and are orthogonally out of phase.

20. A nano-manipulation system, comprising:
means for supporting a substrate having a nano-scale object movably located thereon;
means for positioning a probe of a scanning probe microscope proximate the nano-scale object; and
means for moving the probe relative to the substrate along a gyrating path proximate the nano-scale object to reposition the nano-scale object.

* * * * *

UNITED STATES PATENT AND TRADEMARK OFFICE
CERTIFICATE OF CORRECTION

PATENT NO. : 6,812,460 B1
DATED : November 2, 2004
INVENTOR(S) : Richard E. Stallcup, II and Christof Baur It is certified that error appears in the above-identified patent and that said Letters Patent is hereby corrected as shown below:

<u>Column 7,</u>
Line 34, "regular" should be -- irregular --
Line 66, "alteration" should be -- alterations --

Signed and Sealed this

Fifteenth Day of February, 2005

JON W. DUDAS
*Director of the United States Patent and Trademark Office*